United States Patent
Kakuho et al.

(10) Patent No.: US 10,297,399 B2
(45) Date of Patent: *May 21, 2019

(54) ELECTRONIC COMPONENT CONVEYANCE DEVICE AND METHOD OF MANUFACTURING TAPING ELECTRONIC COMPONENT ARRAY

(71) Applicant: MURATA MANUFACTURING CO., LTD., Kyoto-fu (JP)

(72) Inventors: Masaru Kakuho, Nagaokakyo (JP); Naoto Tanaka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 204 days.

This patent is subject to a terminal disclaimer.

(21) Appl. No.: 15/182,115

(22) Filed: Jun. 14, 2016

(65) Prior Publication Data

US 2016/0372275 A1 Dec. 22, 2016

(30) Foreign Application Priority Data

Jun. 16, 2015 (JP) .................. 2015-121298

(51) Int. Cl.
   *B65G 11/08* (2006.01)
   *H05K 13/02* (2006.01)
   (Continued)

(52) U.S. Cl.
   CPC ............. *H01G 13/00* (2013.01); *H01G 4/012* (2013.01); *H01G 4/30* (2013.01)

(58) Field of Classification Search
   CPC ..... A61M 1/1086; H01G 13/00; H01G 4/012; H01G 4/30
   See application file for complete search history.

(56) References Cited

U.S. PATENT DOCUMENTS 8,191,704 B2 * 6/2012 Ishino .................... A47F 10/06
                                                    198/831
9,769,968 B2 * 9/2017 Kakuho ............... H05K 13/022
(Continued)

FOREIGN PATENT DOCUMENTS

JP    2000-072108 A    3/2000
JP    3461629 B2    10/2003
(Continued)

OTHER PUBLICATIONS

An Office Action; "Notification of Reason for Refusal," issued by the Korean Intellectual Property Office dated Aug. 22, 2017, which corresponds to Korean Patent Application No. 10-2016-0065441 and is related to U.S. Appl. No. 15/182,115.

*Primary Examiner* — Minh Trinh
(74) *Attorney, Agent, or Firm* — Studebaker & Brackett PC

(57) ABSTRACT

As an electronic component conveyance device in which an electronic component is unlikely to jam in a conveyance path. A first magnetic force generation unit is provided lateral to a first sidewall in a midstream part. A second magnetic force generation unit is provided downstream of the first magnetic force generation unit and lateral to a second sidewall in the midstream part. The midstream part includes a first transition part connected with an upstream part and a second transition part connected with a downstream part. The first sidewall is parallel to a conveyance direction in the first transition part. The second sidewall extends in a direction different from the conveyance direction in the first transition part. The second sidewall is parallel to the conveyance direction in the second transition part. The first sidewall extends in a direction different from the conveyance direction in the second transition part.

17 Claims, 8 Drawing Sheets

(51) Int. Cl.
*H01G 13/00* (2013.01)
*H01G 4/30* (2006.01)
*H01G 4/012* (2006.01)

(56) References Cited

U.S. PATENT DOCUMENTS

2016/0368715 A1\* 12/2016 Kakuho ................ B65G 54/02
2016/0372275 A1\* 12/2016 Kakuho ................ H01G 13/00
2017/0001809 A1\* 1/2017 Kakuho ............... H05K 13/022

FOREIGN PATENT DOCUMENTS

| JP | 2011-018698 A | 1/2011 |
| KR | 10-2011-0004291 A | 1/2011 |
| WO | 2014/080544 A1 | 5/2014 |

\* cited by examiner

ELECTRONIC COMPONENT CONVEYANCE DEVICE AND METHOD OF MANUFACTURING TAPING ELECTRONIC COMPONENT ARRAY

CROSS REFERENCE TO RELATED APPLICATIONS

This application claims benefit of priority to Japanese Patent Application 2015-121298 filed Jun. 16, 2015, the entire content of which is incorporated herein by reference.

TECHNICAL FIELD

The present disclosure relates to an electronic component conveyance device and a method of manufacturing a taping electronic component array.

BACKGROUND

A multilayer ceramic capacitor is a known electronic component. The multilayer ceramic capacitor includes a stack of a plurality of internal electrodes and ceramic dielectric layers.

The multilayer ceramic capacitor is typically mounted on a substrate for use. The mechanical strength or floating capacitance of the multilayer ceramic capacitor mounted on the substrate may differ depending on whether the stack direction of the internal electrodes is parallel to or vertical to the surface of the substrate.

In addition, the loudness of acoustic noise may differ depending on whether the stack direction of the internal electrodes is parallel to or vertical to the surface of the substrate. The "acoustic noise" is sound generated by oscillation of the substrate caused by distortion of the multilayer ceramic capacitor transferred to the substrate when the distortion occurs due to variation in applied voltage.

For these reasons, the multilayer ceramic capacitor is desirably mounted on the substrate with the stack direction of the internal electrodes being aligned in a predetermined direction.

JP 2011-018698 A discloses an exemplary electronic component conveyance device that aligns the multilayer ceramic capacitor in the predetermined direction. The conveyance device disclosed in JP 2011-018698 A includes a first conveyance path, a rotation path, and a second conveyance path. The rotation path is provided with a first magnet to apply magnetic force to an electronic component so that internal electrodes of the electronic component are aligned in a predetermined direction. The rotation path includes transition guide walls having an interval therebetween that gradually decreases toward an end connected with the second conveyance path.

SUMMARY

In the electronic component conveyance device disclosed in JP 2011-018698 A, when the electronic component is conveyed at a high speed, the orientation of the electronic component passing through the rotation path becomes tilted, which is likely to cause jamming of the electronic component.

A main object of the present disclosure is to provide an electronic component conveyance device that is unlikely to cause jamming of an electronic component in a conveyance path.

A first electronic component conveyance device according to the present disclosure includes a conveyance path, a first magnetic force generation unit, and a second magnetic force generation unit. The conveyance path includes an upstream part, a midstream part connected with the upstream part, and a downstream part connected with the midstream part. The conveyance path includes a bottom face, a first sidewall, and a second sidewall that extend through the upstream part, the midstream part, and the downstream part. The first sidewall and the second sidewall face each other at an interval. An interval P2 between the first sidewall and the second sidewall in the midstream part is larger than an interval P1 between the first sidewall and the second sidewall in the upstream part and an interval P3 between the first sidewall and the second sidewall in the downstream part. The first magnetic force generation unit is provided lateral to the first sidewall in the midstream part. The second magnetic force generation unit is arranged at a farther downstream side than the first magnetic force generation unit and lateral to the second sidewall in the midstream part. The midstream part includes a first transition part connected with the upstream part and a second transition part connected with the downstream part. The first sidewall is parallel to a conveyance direction in the first transition part. The second sidewall extends in a direction different from the conveyance direction in the first transition part. The second sidewall is parallel to the conveyance direction in the second transition part. The first sidewall extends in a direction different from the conveyance direction in the second transition part. In the first electronic component conveyance device according to the present disclosure, a length direction of an electronic component becomes parallel to the conveyance direction, when the electronic component rotates or before the electronic component is conveyed to the downstream part. Thus, in the electronic component conveyance device according to the present disclosure, the electronic component is unlikely to jam.

A second electronic component conveyance device according to the present disclosure includes a conveyance path, a first magnetic force generation unit, and a second magnetic force generation unit. The conveyance path includes an upstream part, a midstream part connected with the upstream part, and a downstream part connected with the midstream part. The conveyance path includes a bottom face, a first sidewall, and a second sidewall that extend through the upstream part, the midstream part, and the downstream part. The first sidewall and the second sidewall face each other at an interval. An interval P2 between the first sidewall and the second sidewall in the midstream part is larger than an interval P1 between the first sidewall and the second sidewall in the upstream part and an interval P3 between the first sidewall and the second sidewall in the downstream part. The first magnetic force generation unit is provided lateral to the first sidewall in the midstream part. The second magnetic force generation unit is arranged at a farther downstream side than the first magnetic force generation unit and lateral to the second sidewall in the midstream part. The midstream part includes a first transition part connected with the upstream part and a second transition part connected with the downstream part. The first sidewall is parallel to a conveyance direction in the first transition part. The second sidewall is parallel to the conveyance direction in the second transition part. In the second electronic component conveyance device according to the present disclosure, a length direction of an electronic component becomes parallel to the conveyance direction, when the electronic component rotates or before the electronic component is conveyed to the downstream part. Thus, in the electronic component conveyance device according to the present disclosure, the electronic component is unlikely to jam.

In the first and second electronic component conveyance devices according to the present disclosure, it is preferable that the second sidewall is tilted with respect to the first sidewall in the second transition part, and an interval between the first sidewall and the second sidewall is smaller at a position closer to the downstream part.

In the first and second electronic component conveyance devices according to the present disclosure, the second sidewall preferably includes a portion orthogonal to the conveyance direction in the first transition part.

In the first and second electronic component conveyance devices according to the present disclosure, magnetic force generated by the second magnetic force generation unit is preferably weaker than magnetic force generated by the first magnetic force generation unit.

In the first and second electronic component conveyance devices according to the present disclosure, a height of a center of the first magnetic force generation unit with respect to the bottom face is preferably higher than P3/2.

In the first and second electronic component conveyance devices according to the present disclosure, a distance between a center of the first magnetic force generation unit and the bottom face is preferably larger than a distance between a center of an electronic component being conveyed and the bottom face.

In the first and second electronic component conveyance devices according to the present disclosure, the bottom face may include a separating structure that separates a portion of a lower face of an electronic component off the bottom face.

The first and second electronic component conveyance devices according to the present disclosure may further include a floating mechanism that separates a portion of a lower face of an electronic component off the bottom face by air pressure.

In the electronic component conveyance devices according to the present disclosure, the first magnetic force generation unit and the second magnetic force generation unit preferably each include a permanent magnet or an electric magnet.

A method of manufacturing a taping electronic component array according to the present disclosure includes aligning stack directions of a plurality of internal conductors in the electronic components using the electronic component conveyance device according to the present disclosure, and housing the electronic components of which the stack directions are aligned into recesses in a tape to obtain a taping electronic component array including the tape and the electronic components housed in the recesses.

The present disclosure can provide an electronic component conveyance device in which an electronic component is unlikely to jam in a conveyance path.

DETAILED DESCRIPTION

Figure 1:
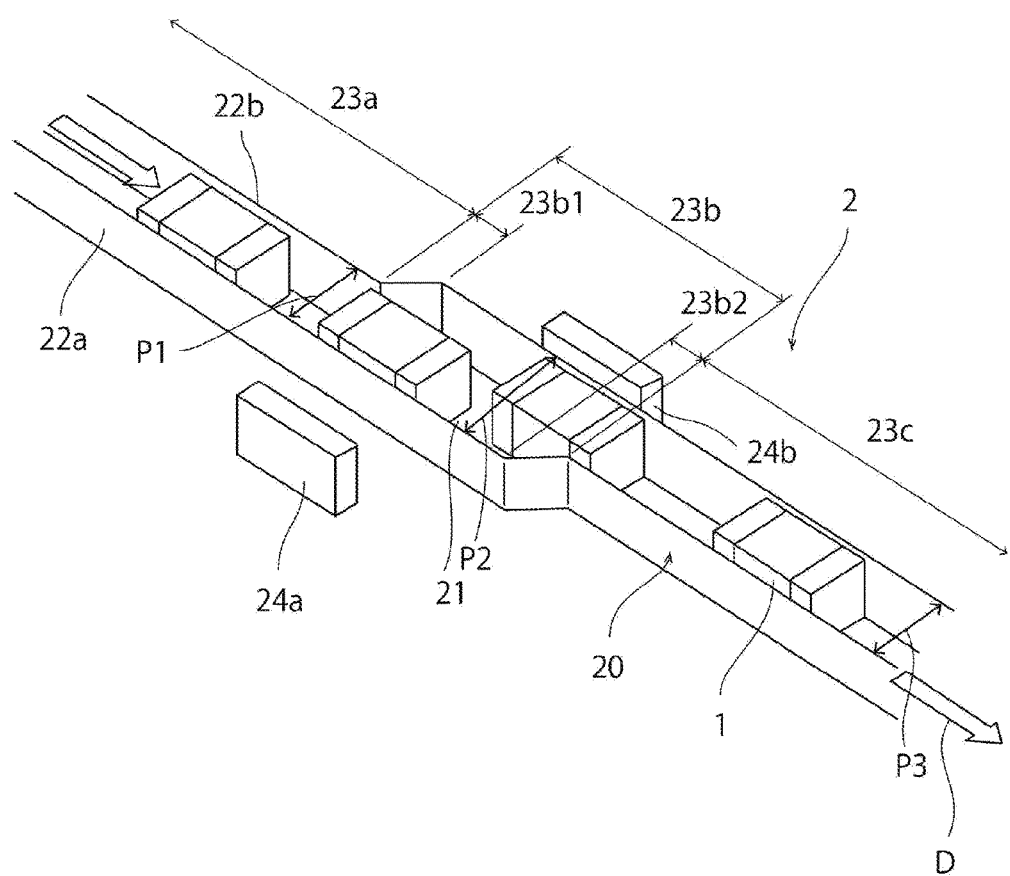
FIG. 1 is a schematic perspective view of a main part of an electronic component conveyance device according to a first embodiment.

Exemplary preferred embodiments of the present disclosure will be described below. The following embodiments, however, are merely examples. The present disclosure is not limited by the following embodiments.

In the accompanying drawings referred to in the embodiments and the like, members having substantially identical functions are denoted by an identical reference numeral. The drawings referred to in the embodiments and the like are schematically illustrated. The dimension, the ratio, and other parameters of an object illustrated in the drawings may be different from those of the object in reality. The dimension, the ratio, and other parameters of the object may be also different between the drawings. Specific values of the dimension, the ratio, and other parameters of the object should be determined according to the following description.

Figure 2:
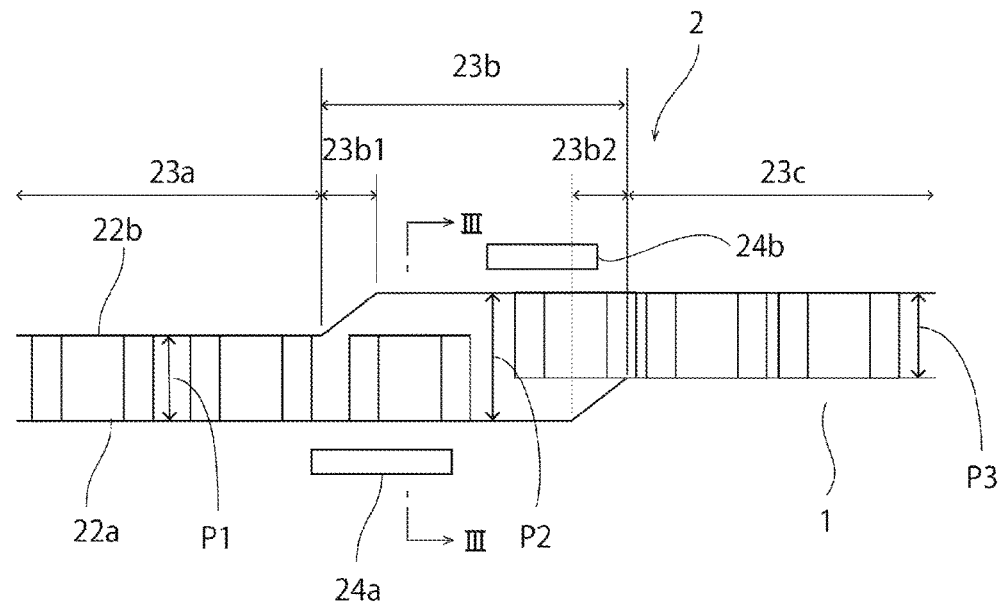
FIG. 2 is a schematic plan view of the main part of the electronic component conveyance device according to the first embodiment.

FIG. 1 is a schematic perspective view of a main part of an electronic component conveyance device according to the present embodiment. FIG. 2 is a schematic plan view of the main part of the electronic component conveyance device according to the present embodiment. The electronic component conveyance device 2 illustrated in FIGS. 1 and 2 conveys an electronic component 1. The electronic component 1 thus conveyed may be any rectangular parallelepiped.

Figure 6:
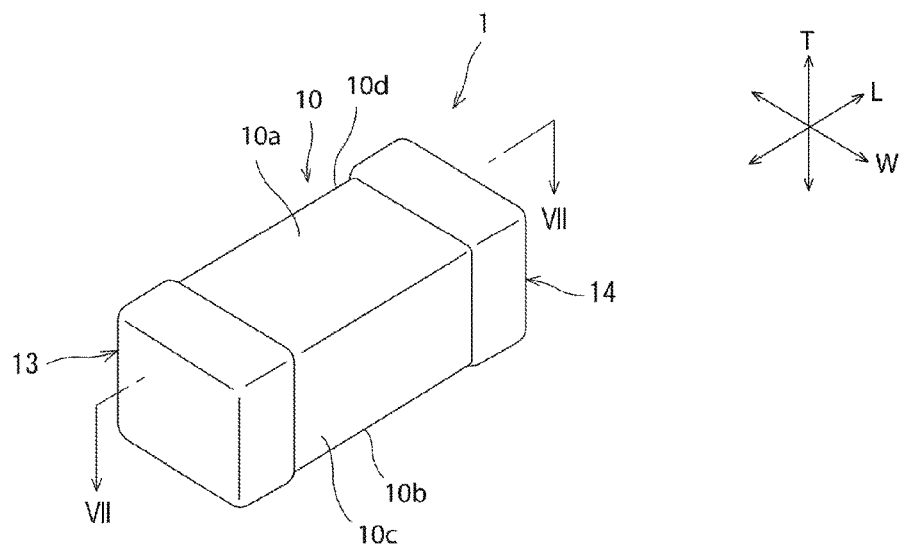
FIG. 6 is a schematic perspective view of an electronic component conveyed in the first embodiment.
Figure 7:
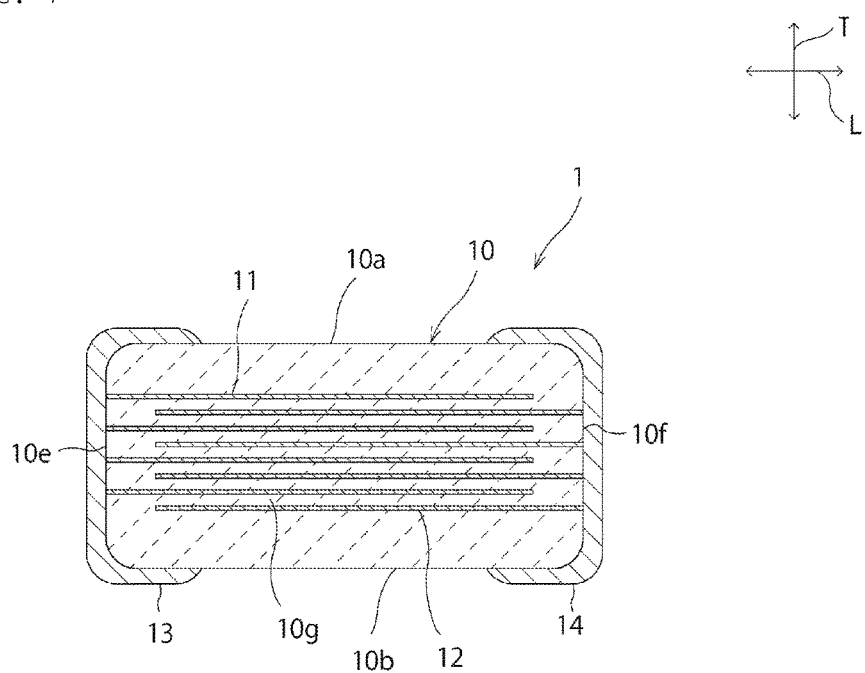
FIG. 7 is a schematic sectional view taken along line VII-VII in FIG. 6.

Specifically, the present embodiment describes an example in which the electronic component 1 illustrated in FIGS. 6 and 7 is conveyed by the electronic component conveyance device 2.

FIG. 6 is a schematic perspective view of the electronic component 1 conveyed in the present embodiment. FIG. 7 is a schematic sectional view taken along line VII-VII in FIG. 6.

The electronic component 1 illustrated in FIGS. 6 and 7 is a rectangular parallelepiped capacitor. Specifically, the electronic component 1 is a rectangular parallelepiped multilayer ceramic capacitor. The present disclosure is suitable for the electronic component 1 including a large capacitance that is likely to generate acoustic noise, especially for the electronic component 1 having a capacitance of 1 µF or larger or a capacitance of 10 µF or larger.

In the present disclosure, the electronic component is not limited to a capacitor. In the present disclosure, the electronic component may be a thermistor or an inductor, for example.

The electronic component 1 includes an electronic component body 10. The electronic component body 10 has a substantially rectangular parallelepiped shape. This substantially rectangular parallelepiped shape includes, in addition to a rectangular parallelepiped shape, the shape of a rectangular parallelepiped with rounded corners and edges.

The electronic component body 10 has a first main face 10a and a second main face 10b, a first side face 10c and a second side face 10d, and a first end face 10e and a second end face 10f (refer to FIG. 7). The first and second main faces 10a and 10b each extend in a length direction L and a width direction W. The length direction L and the width direction W are orthogonal to each other. The first and second side faces 10c and 10d each extend in the length direction L and a thickness direction T. The thickness direction T is orthogonal to the length direction L and the width direction W. The first and second end faces 10e and 10f each extend in the width direction W and the thickness direction T.

The dimension of the electronic component body 10 in the length direction L is larger than that in the width direction W and the thickness direction T. The dimension of the electronic component body 10 in the width direction W is substantially equal to the dimension of the electronic component body 10 in the thickness direction T. Specifically, the dimension of the electronic component body 10 in the width direction W is between 0.8 and 1.2 (inclusive) times as large as the dimension of the electronic component body 10 in the thickness direction T.

Specifically, in the present embodiment, the dimension of the electronic component body 10 in the length direction L is preferably between 0.6 mm and 2.0 mm inclusive. The dimension of the electronic component body 10 in the width direction W is preferably between 0.3 mm and 1.0 mm inclusive. The dimension of the electronic component body 10 in the thickness direction T is preferably between 0.3 mm and 1.0 mm inclusive.

The electronic component body 10 is made of ferroelectric ceramics to obtain a large capacitance. Specifically, examples of the dielectric ceramics include $BaTiO_3$, $CaTiO_3$, and $SrTiO_3$. To the electronic component body 10 may be added accessory components such as a Mn compound, a Mg compound, a Si compound, a Fe compound, a Cr compound, a Co compound, a Ni compound, and a rare earth compound, as appropriate, in response to characteristics required for the electronic component 1. The ferroelectric ceramics preferably has a relative permittivity of 2000 or larger, and more preferably has a relative permittivity of 3000 or larger. In this case, the capacitances of 1 µF or larger and 10 µF or larger can be achieved with the above-described dimension range of the electronic component body 10. The present disclosure is suitably applicable to the electronic component 1 that is likely to generate acoustic noise.

As illustrated in FIG. 7, a plurality of first internal electrodes 11 and a plurality of second internal electrodes 12 are provided as internal conductors inside the electronic component body 10.

The first internal electrodes 11 and the second internal electrodes 12 are alternately stacked in the thickness direction T, and face each other in the thickness direction T with a ceramic part 10g interposed therebetween. To increase the number of the internal electrodes 11 and 12, the ceramic part 10g preferably has a thickness of 1 µm or smaller. A too small thickness of the ceramic part 10g, however, may lead to a low voltage-proof characteristic. For this reason, the ceramic part 10g preferably has a thickness of 0.3 µm or larger. The total number of the internal electrodes 11 and 12 is preferably 350 or larger. An increase in the total volume of the internal electrodes 11 and 12 achieved by increasing the number thereof facilitates alignment of a stack direction of the internal electrodes in the electronic component 1.

The first internal electrodes 11 are provided in the length direction L and the width direction W. The first internal electrodes 11 are extended to the first end face 10e. The first internal electrodes 11 are not extended to the first and second main faces 10a and 10b, the first and second side faces 10c and 10d, and the second end face 10f.

The second internal electrodes 12 are provided in the length direction L and the width direction W. The second internal electrodes 12 are extended to the second end face 10f. The second internal electrodes 12 are not extended to the first and second main faces 10a and 10b, the first and second side faces 10c and 10d, and the first end face 10e.

The first and second internal electrodes 11 and 12 each contain metal, especially ferromagnetic metal. Specifically, examples of ferromagnetic metal preferably used include an alloy containing at least one of Ni, Fe, Ni, and Fe.

The first end face 10e is provided with a first external electrode 13. The first external electrode 13 extends from the first end face 10e to part of the first and second main faces 10a and 10b and part of the first and second side faces 10c and 10d. The first external electrode 13 is connected with the first internal electrodes 11 at the first end face 10e.

The second end face 10f is provided with a second external electrode 14. The second external electrode 14 extends from the second end face 10f to part of the first and second main faces 10a and 10b and part of the first and second side faces 10c and 10d. The second external electrode 14 is connected with the second internal electrodes 12 at the second end face 10f.

The first and second external electrodes 13 and 14 each contain at least one of Pt, Au, Ag, Cu, Ni, and Cr, for example.

The following describes the electronic component conveyance device 2 in detail with reference to FIGS. 1 and 2.

Figure 8:
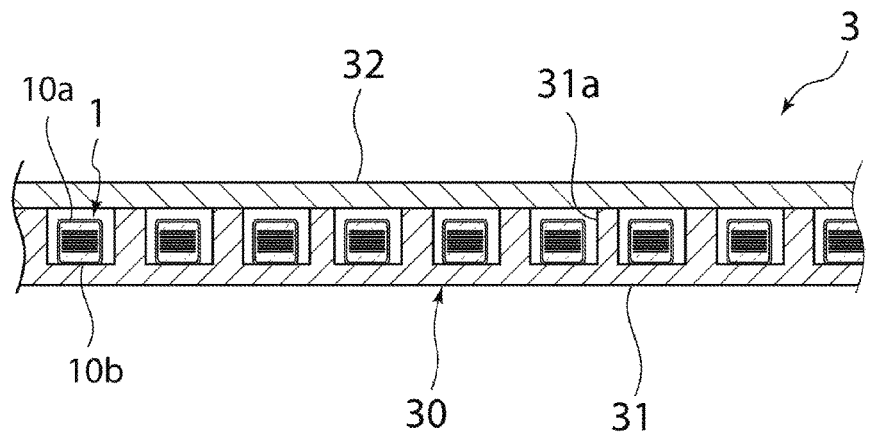
FIG. 8 is a schematic sectional view of a taping electronic component array manufactured in the first embodiment.

The electronic component conveyance device 2 includes a conveyance path 20. The conveyance path 20 is connected with a housing unit (not illustrated) that houses a plurality of electronic components 1 and supplies each electronic component 1 onto the conveyance path 20. The electronic component 1 conveyed in the conveyance path 20 is inserted, by an inserting unit not illustrated, into each of a plurality of recesses 31a provided separately from each other in an elongate carrier tape 31 illustrated in FIG. 8. Thereafter, a cover tape 32 is placed on the carrier tape 31. Thus, a taping electronic component array 3 is manufactured that includes a tape 30 including the carrier tape 31 and the cover tape 32, and the electronic components 1 housed in the recesses 31a.

As illustrated in FIGS. 1 and 2, the electronic components 1 are conveyed in the length direction L in the conveyance path 20.

The conveyance path 20 has a bottom face 21, a first sidewall 22a, and a second sidewall 22b. The bottom face 21 is horizontally provided. The first sidewall 22a extends upwardly from one side edge of the bottom face 21 in the width direction thereof. The first sidewall 22a is vertical to the bottom face 21. The second sidewall 22b extends upwardly from the other side edge of the bottom face 21 in the width direction thereof. The second sidewall 22b is vertical to the bottom face 21.

The conveyance path 20 has an upstream part 23a, a midstream part 23b connected with the upstream part 23a, and a downstream part 23c connected with the midstream part 23b. The upstream part 23a, the midstream part 23b, and the downstream part 23c are provided in this order from the housing unit (upstream) toward the inserting unit (downstream). The bottom face 21, the first sidewall 22a, and the second sidewall 22b extend through the upstream part 23a, the midstream part 23b, and the downstream part 23c.

In the upstream part 23a and the downstream part 23c, the first sidewall 22a and the second sidewall 22b are provided at such an interval therebetween that the electronic component 1 is not rotatable about the length direction L. In other words, when the electronic component 1 has a dimension W1 in the width direction W and a dimension T1 in the thickness direction T, intervals P1 and P3 between the first sidewall 22a and the second sidewall 22b in the upstream part 23a and the downstream part 23c, respectively, are larger than W1 and T1 and smaller than $\{(W1)^2+(T1)^2\}^{1/2}$.

An interval P2 between the first sidewall 22a and the second sidewall 22b in the midstream part 23b is larger than the intervals P1 and P3 between the first sidewall 22a and the second sidewall 22b in the upstream part 23a and the downstream part 23c, respectively. Specifically, in the midstream part 23b, the first sidewall 22a and the second sidewall 22b are provided at such an interval therebetween that the electronic component 1 is rotatable about the length direction L. In other words, the interval P2 between the first sidewall 22a and the second sidewall 22b in the midstream part 23b is larger than $\{(W1)^2+(T1)^2\}^{1/2}$.

The midstream part 23b includes a first transition part 23b1 connected with the upstream part 23a. In the first transition part 23b1, the second sidewall 22b is tilted with respect to a conveyance direction D. The first sidewall 22a is parallel to the conveyance direction D and is flat (plane) in the upstream part 23a and the midstream part 23b. Thus, in the first transition part 23b1, the first sidewall 22a and the second sidewall 22b have an interval therebetween that gradually increases further away from the upstream part 23a.

The midstream part 23b includes a second transition part 23b2 connected with the downstream part 23c. In the second transition part 23b2, the second sidewall 22b is tilted with respect to the conveyance direction D. The first sidewall 22a is parallel to the conveyance direction D and is flat (plane) in the midstream part 23b and the downstream part 23c. Thus, in the second transition part 23b2, the first sidewall 22a and the second sidewall 22b have an interval therebetween that gradually decreases closer to the downstream part 23c.

The electronic component conveyance device 2 includes a first magnetic force generation unit 24a and a second magnetic force generation unit 24b.

The first magnetic force generation unit 24a and the second magnetic force generation unit 24b each generate magnetic force. The first magnetic force generation unit 24a and the second magnetic force generation unit 24b may each include a permanent magnet or an electromagnet, for example.

The first magnetic force generation unit 24a is provided lateral to the first sidewall 22a. In the midstream part 23b, the first magnetic force generation unit 24a applies magnetic force to the electronic component 1 so that the stack direction of the plurality of internal electrodes (internal conductors) 11 and 12 in the electronic component 1 (hereinafter simply referred to as a "stack direction of the electronic component 1") is aligned with a predetermined direction (a predetermined desirable constant direction, the horizontal direction, or the vertical direction). Specifically, when the electronic component 1 of which the stack direction is aligned with the predetermined direction is conveyed from the upstream part 23a, the magnetic force applied by the first magnetic force generation unit 24a does not change (rotate) the stack direction of the electronic component 1. In contrast, when the electronic component 1 of which the stack direction intersects with the predetermined direction is conveyed from the upstream part 23a, the magnetic force by the first magnetic force generation unit 24a is applied to the electronic component 1, so that the electronic component 1 rotates about an axis extending in the length direction L. As a result, the stack direction of the electronic component 1 becomes aligned with the predetermined direction. Accordingly, the electronic component 1 is conveyed in the downstream part 23c with its stack direction being aligned with the predetermined direction. This is a process performed in the midstream part 23b to align the stack direction of the electronic component 1. The electronic component 1 of which the stack direction is aligned is then conveyed to the downstream part 23c.

The second magnetic force generation unit 24b is provided lateral to the second sidewall 22b in the midstream part 23b and downstream of the first magnetic force generation unit 24a. Magnetic Force generated by the second magnetic force generation unit 24b is weaker than the magnetic force generated by the first magnetic force generation unit 24a. When the second magnetic force generation unit 24b is provided in this arrangement, the attractive force applied by the second magnetic force generation unit 24b facilitates separation of the electronic component 1 passing by the first magnetic force generation unit 24a off the first sidewall 22a, and thus rotation of the electronic component 1. In order to facilitate rotation of the electronic component 1 in this manner, the first magnetic force generation unit 24a and the second magnetic force generation unit 24b are preferably not opposite to each other, in other words, do not overlap with each other in a width direction orthogonal to the conveyance direction D. Specifically, the first magnetic force generation unit 24a preferably does not overlap with other magnetic force generation units including the second magnetic force generation unit 24b, and the second magnetic force generation unit 24b preferably does not overlap with other magnetic force generation units including the first magnetic force generation unit 24a.

In the electronic component conveyance device 2, the electronic component 1 is attracted to the first sidewall 22a by the first magnetic force generation unit 24a. The electronic component 1 thus attracted is rotated by the magnetic force applied by the first magnetic force generation unit 24a. The electronic component 1 thus rotated is conveyed downstream. Having reached a region in which the second magnetic force generation unit 24b is provided, the electronic component 1 thus conveyed is attracted to the second sidewall 22b by the second magnetic force generation unit 24b. Thereafter, the electronic component 1 is conveyed to the downstream part 23c through a second transition part 22e.

For example, when the first sidewall is tilted with respect to the conveyance direction in the first transition part, the electronic component is conveyed along the tilted first sidewall and reaches a region in which the first magnetic force generation unit is provided while the length direction of the electronic component is tilted with respect to the conveyance direction in some cases. In such a case, the electronic component rotates being tilted with respect to the conveyance direction off the first and second sidewalls sometimes. In addition, the length direction of the electronic component becomes tilted with respect to the conveyance direction in some cases while being rotated. As a result, the electronic component of which the length direction is tilted with respect to the conveyance direction is conveyed downstream and potentially jams in the second transition part.

For example, when the second sidewall is tilted with respect to the conveyance direction in the second transition part, the length direction of the electronic component becomes tilted with respect to the conveyance direction due to the tilted second sidewall in some cases. As a result, the electronic component of which the length direction is tilted with respect to the conveyance direction potentially jams in the second transition part.

In the electronic component conveyance device 2, however, the first sidewall 22a is plane (flat) where the upstream part 23a is connected with the midstream part 23b. In other words, the first sidewall 22a extends in parallel to the conveyance direction and has neither a level difference nor a tilted portion in the first transition part 23b1. Accordingly, the electronic component 1 rotates about the length direction L parallel to the conveyance direction D while being in contact with the plane first sidewall 22a by the first magnetic force generation unit 24a. Thus, the length direction L is not tilted with respect to the conveyance direction D when the electronic component 1 rotates. In addition, the length direction L of the electronic component 1 is unlikely to become tilted with respect to the conveyance direction D while the electronic component 1 is rotating. The second sidewall 22b extends in a direction different from the conveyance direction D in the first transition part 23b1 to have a difference between the interval P1 in the upstream part 23a and the interval P2 in the midstream part 23b. The second sidewall 22b is tilted with respect to the conveyance direction D and the first sidewall 22a in the first transition part 23b1. The second sidewall 22b is preferably orthogonal to the conveyance direction D in the first transition part 23b1 so as to have a longer conveyance distance in which the electronic component 1 can rotate.

Having reached the region in which the second magnetic force generation unit 24b is provided, the electronic component 1 is attracted to the second sidewall 22b by the second magnetic force generation unit 24b. The second sidewall 22b is plane (flat) where the midstream part 23b is connected with the downstream part 23c. In other words, the second sidewall 22b extends in parallel to the conveyance direction D and has neither a level difference nor a tilted portion in the second transition part 23b2. Accordingly, the electronic component 1 attracted to the second sidewall 22b parallel to the conveyance direction D is conveyed with the length direction L being parallel to the conveyance direction D. As a result, the electronic component 1 is conveyed to the downstream part 23c without jamming in the second transition part 23e. In this manner, in the electronic component conveyance device 2, the length direction L of the electronic component 1 becomes parallel to the conveyance direction D when the electronic component 1 rotates or before the electronic component 1 is conveyed to the second transition part 23e. Thus, the electronic component 1 is unlikely to jam in the electronic component conveyance device 2. The first sidewall 22a extends in a direction different from the conveyance direction D in the second transition part 23b2 to have a difference between the interval P3 in the downstream part 23c and the interval P2 in the midstream part 23b. The first sidewall 22a is tilted with respect to the conveyance direction D and the second sidewall 22b in the second transition part 23b2.

To more effectively reduce jamming of the rotated electronic component 1 in the midstream part 23b, the first sidewall 22a is preferably tilted with respect to the conveyance direction D such that an interval between the first sidewall 22a and the second sidewall 22b gradually decreases in the second transition part 23e.

In the electronic component conveyance device 2 configured as described above, a central axis of the upstream part 23a and a central axis of the downstream part 23c are shifted in the width direction. Each central axis is an axis passing through the center of the width direction of the conveyance path and extending in parallel to the conveyance direction D. Thus, the central axis of the electronic component 1 passing through the center of the electronic component 1 being conveyed and extending in parallel to the length direction L shifts in the width direction while the electronic component 1 is conveyed from the upstream part 23a to the downstream part 23c. The central axis of the electronic component 1 shifts in the width direction in the midstream part 23b.

When in contact with the bottom face and the sidewalls, for example, the electronic component is unlikely to be rotated by the magnetic force applied by the first magnetic force generation unit. As a result, the stack direction of the internal electrodes in the electronic component is potentially not aligned in a reliable manner.

Figure 3:
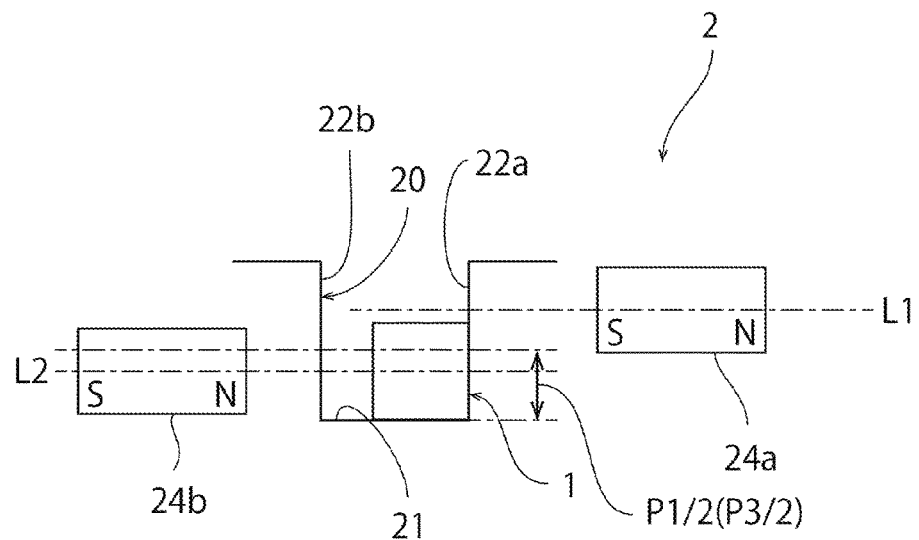
FIG. 3 is a schematic sectional view taken along line III-III in FIG. 2.
Figure 4:
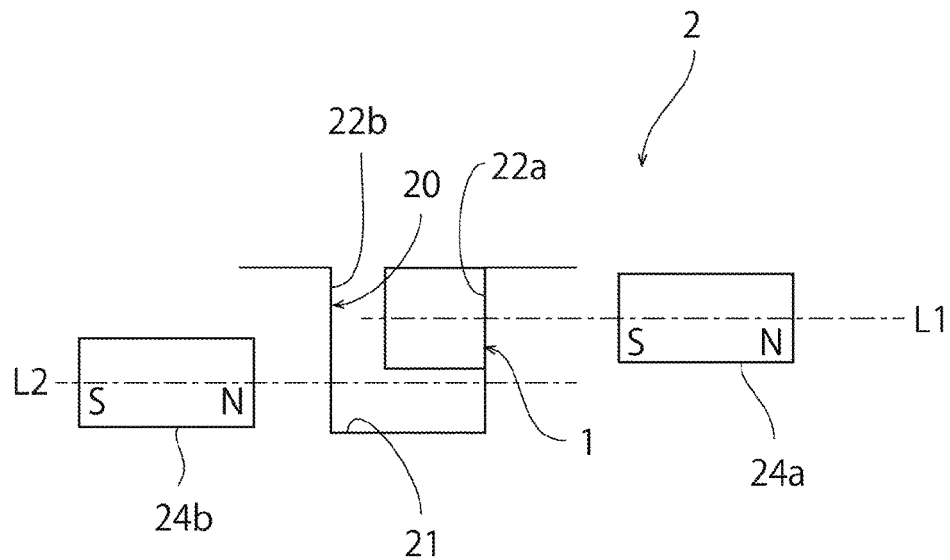
FIG. 4 is a schematic sectional view taken along line III-III in FIG. 2.
Figure 5:
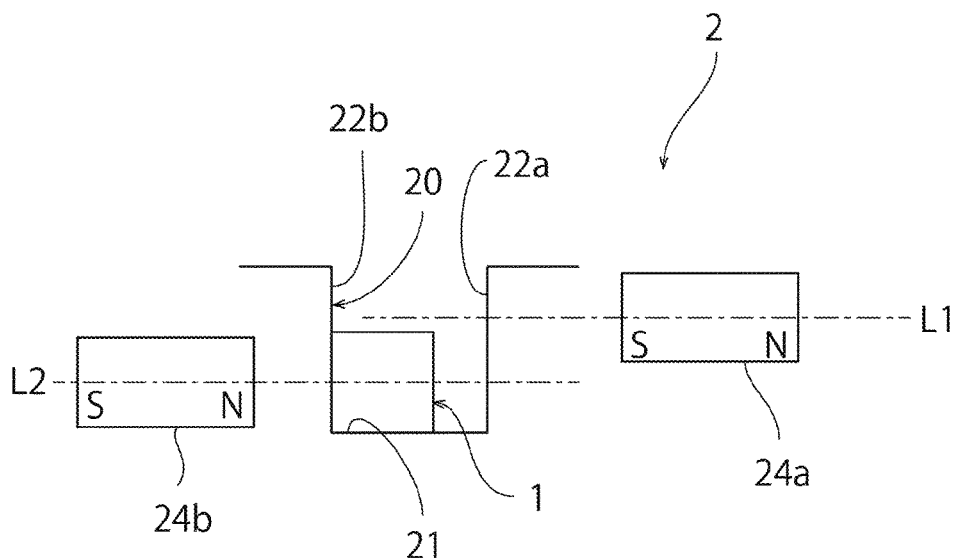
FIG. 5 is a schematic sectional view taken along line III-III in FIG. 2.

The electronic component conveyance device 2 has such a configuration that a lower face (opposite to the bottom face 21) of the electronic component 1 becomes partially separated off the bottom face 21 of the conveyance path 20 due to the magnetic force applied by the first magnetic force generation unit 24a in the midstream part 23b. Specifically, as illustrated in FIGS. 3 to 5, the first magnetic force generation unit 24a is provided such that the center of the first magnetic force generation unit 24a is positioned higher than the center of the electronic component 1 in contact with the bottom face 21 of the conveyance path 20. Thus, a center line L1 of the first magnetic force generation unit 24a is positioned higher than a center line L2 extending in the width direction W of the electronic component 1. In other words, the height of the center of the first magnetic force generation unit 24a with respect to the bottom face 21 is larger than P1/2 or P3/2, where P1 represents the interval between the first sidewall 22a and the second sidewall 22b in the upstream part 23a and P3 represents the interval thereof in the downstream part 23c. When the height of the center of the first magnetic force generation unit 24a with respect to the bottom face 21 is larger than P1/2 or P3/2, the distance between the center of the first magnetic force generation unit 24a and the bottom face 21 is larger than the distance between the center of the electronic component 1 and the bottom face 21. Thus, as illustrated in FIG. 4, in the midstream part 23b, in which the first magnetic force generation unit 24a is provided, the lower face of the electronic component 1 becomes partially separated off the bottom face 21, so that the electronic component 1 is likely to rotate. As a result, the stack direction of the internal electrodes 11 and 12 in the electronic component 1 is likely to be aligned.

In contrast, as illustrated in FIG. 5, the center of the second magnetic force generation unit 24b is closer to the bottom face 21 than the center of the first magnetic force generation unit 24a. In other words, the distance between the center of the second magnetic force generation unit 24b and the bottom face 21 is smaller than the distance between the center of the first magnetic force generation unit 24a and the bottom face 21. The second magnetic force generation unit 24b is provided such that the center of the second magnetic force generation unit 24b is substantially at the same height as that of the center of the electronic component 1 in contact with the bottom face 21 or lower than the center of the electronic component 1. Accordingly, since the electronic component 1 comes into contact with both of the second sidewall 22b and the bottom face 21 in a region of the conveyance path 20, in which the second magnetic force generation unit 24b is provided, the electronic component 1 is likely to have a stable orientation. Thus, the electronic component 1 is unlikely to jam in the midstream part 23b.

Similarly to the first magnetic force generation unit 24a, the second magnetic force generation unit 24b may be provided such that the lower face of the electronic component 1 becomes partially separated off the bottom face 21 of the conveyance path 20 due to the magnetic force applied by the second magnetic force generation unit 24b in the midstream part 23b.

The following describes other preferred embodiments of the present disclosure. In the following description, a member having substantially the same function as that in the first embodiment is denoted with the same reference numeral, and description thereof will be omitted.

Second to Eighth Embodiments

FIGS. 9 to 15 are each a schematic sectional view of a main part of an electronic component conveyance device according to second to eighth embodiments.

The first embodiment describes the example in which the first magnetic force generation unit 24a is provided such that the lower face of the electronic component 1 becomes partially separated off the bottom face 21 due to the magnetic force applied by the first magnetic force generation unit 24a in the midstream part 23b, thereby facilitating rotation of the electronic component 1. However, the present disclosure is not limited to this configuration. Another method may be applied to partially separate the lower face of the electronic component 1 off the bottom face 21. For example, the bottom face 21 may have a separating structure 40 that partially separates the lower face of the electronic component 1 off the bottom face 21 of the conveyance path 20 in the midstream part. In this case also, similarly to the first embodiment, the electronic component 1 is likely to rotate in the midstream part 23b. Accordingly, the stack direction of the internal electrodes 11 and 12 in the electronic component 1 is aligned in a highly reliable manner.

Figure 9:
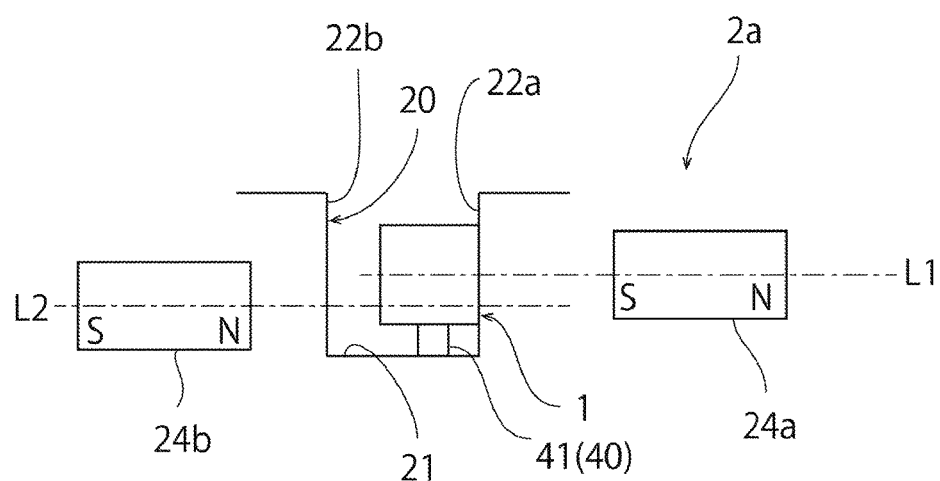
FIG. 9 is a schematic sectional view of a main part of an electronic component conveyance device according to a second embodiment.

As an example, in an electronic component conveyance device 2a according to the second embodiment illustrated in FIG. 9, a protrusion 41 extending upwardly from the bottom face 21 is provided as the separating structure 40. When the protrusion 41 is positioned lower than the electronic component 1, the lower face of the electronic component 1 is likely to partially separate off the bottom face 21 and the electronic component 1 is likely to rotate.

Figure 10:
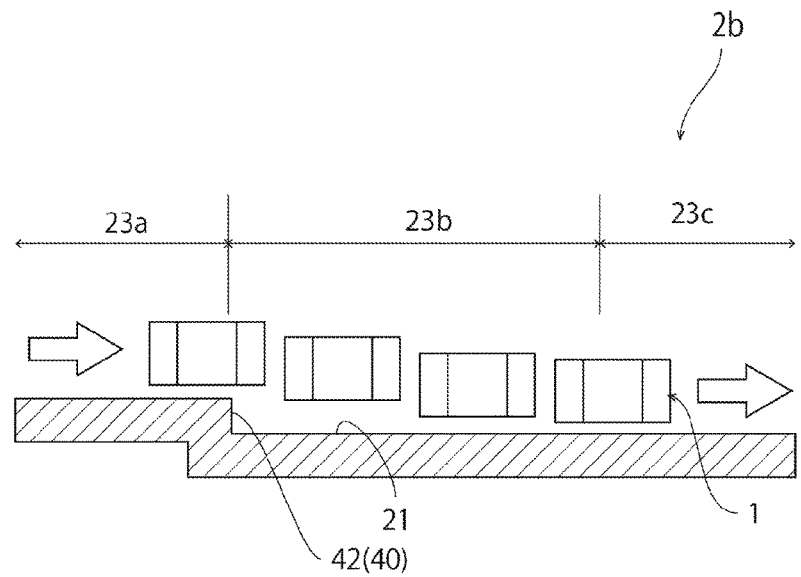
FIG. 10 is a schematic sectional view of a main part of an electronic component conveyance device according to a third embodiment.

As another example, an electronic component conveyance device 2b according to the third embodiment illustrated in FIG. 10 has the separating structure 40 that the bottom face 21 is provided with such a level difference 42 that the bottom face 21 is lower on a downstream side. The lower face of the electronic component 1 is likely to become partially separated off the bottom face 21 immediately after the electronic component 1 has passed the level difference 42, and the electronic component 1 is likely to rotate.

Figure 11:
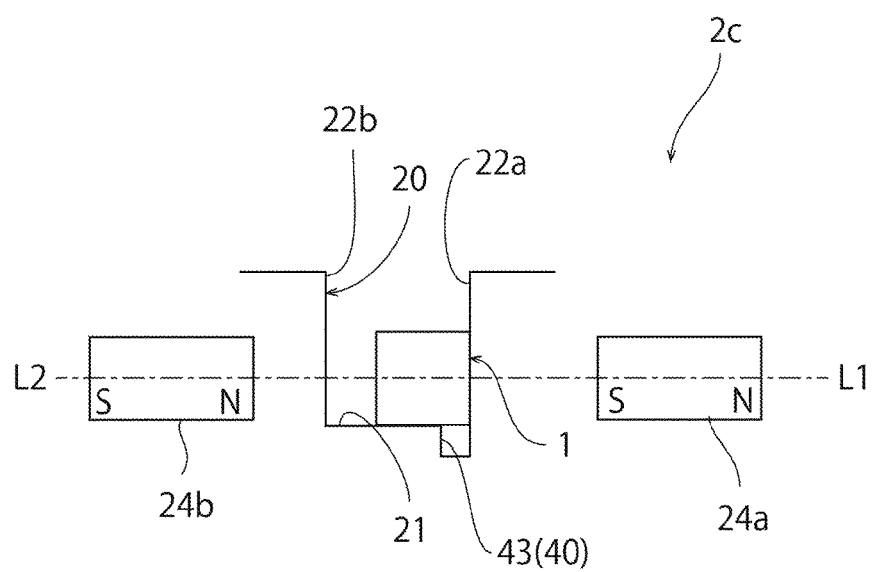
FIG. 11 is a schematic sectional view of a main part of an electronic component conveyance device according to a fourth embodiment.
Figure 12:
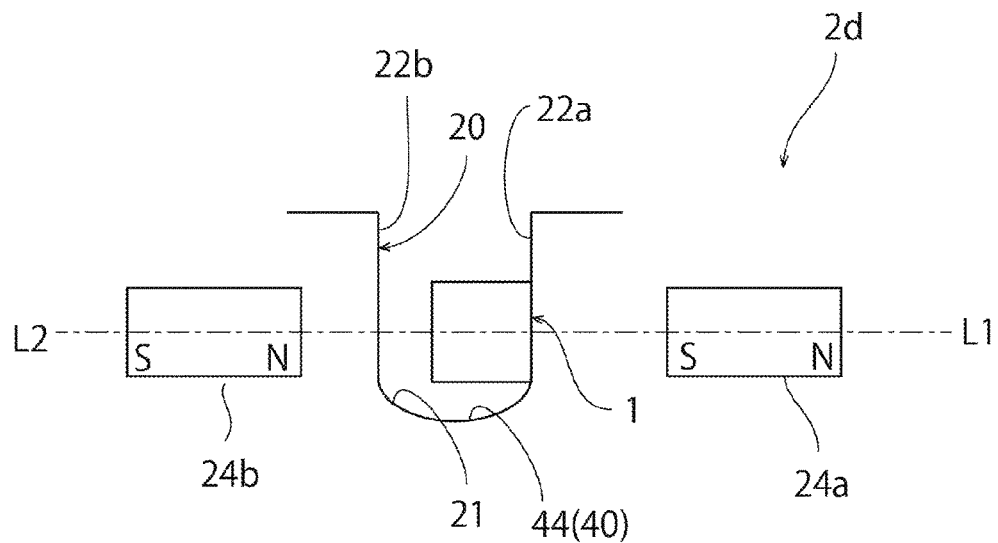
FIG. 12 is a schematic sectional view of a main part of an electronic component conveyance device according to a fifth embodiment.
Figure 13:
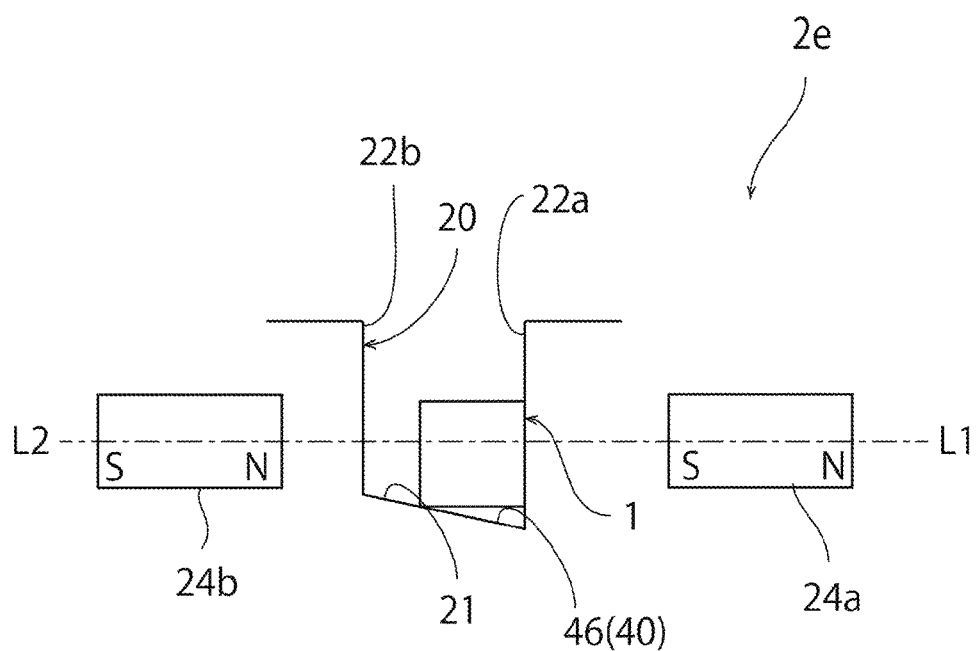
FIG. 13 is a schematic sectional view of a main part of an electronic component conveyance device according to a sixth embodiment.

As another example, an electronic component conveyance device 2c according to the fourth embodiment illustrated in FIG. 11 has the separating structure 40 that the bottom face 21 is provided with a recess 43. The recess 43 is provided on an extended line of the first sidewall 22a. When the recess 43 is positioned lower than the electronic component 1, the lower face of the electronic component 1 is likely to partially separate off the bottom face 21 and the electronic component 1 is likely to rotate.

As another example, an electronic component conveyance device 2d according to the fifth embodiment illustrated in FIG. has the separating structure 40 that the bottom face 21 includes a curved surface part 44. Specifically, in the present embodiment, the entire bottom face 21 in the midstream part is the curved surface part 44. When the curved surface part 44 is positioned lower than the electronic component 1, the lower face of the electronic component 1 is likely to partially separate off the bottom face 21 and the electronic component 1 is likely to rotate.

As another example, an electronic component conveyance device 2e according to the sixth embodiment illustrated in FIG. has the separating structure 40 that the bottom face 21 includes a tilted surface 46 tilted with respect to the horizontal plane. An angle between the first sidewall 22a and the bottom face 21 is smaller than 90°, and an angle between the second sidewall 22b and the bottom face 21 is larger than 90°. In the present embodiment, too, the lower face of the electronic component 1 becomes partially separated off the bottom face 21, and thus the electronic component 1 is likely to rotate. When the angle between the first sidewall 22a and the bottom face 21 is larger than 90°, the angle between the second sidewall 22b and the bottom face 21 may be smaller than 90°.

Figure 14:
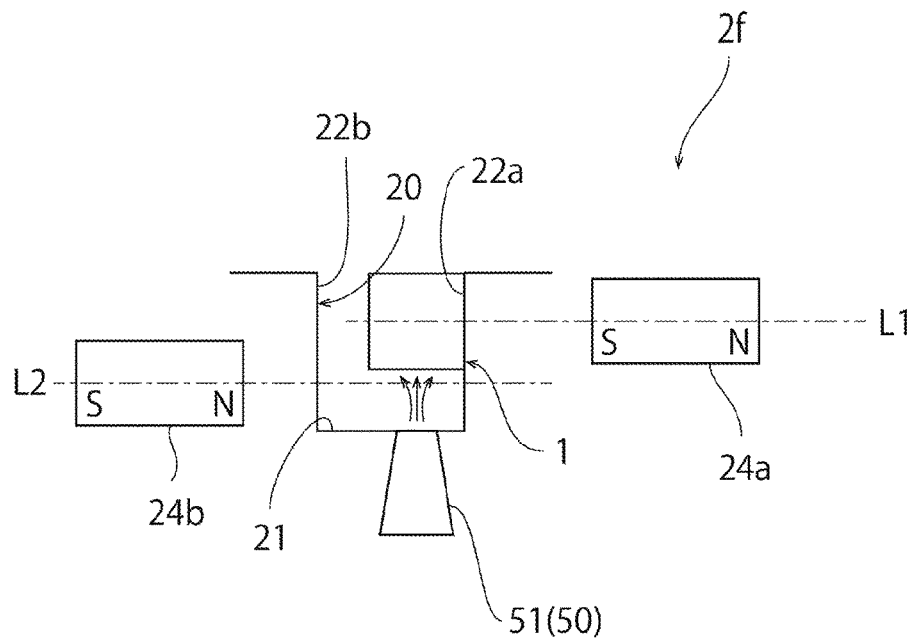
FIG. 14 is a schematic sectional view of a main part of an electronic component conveyance device according to a seventh embodiment.
Figure 15:
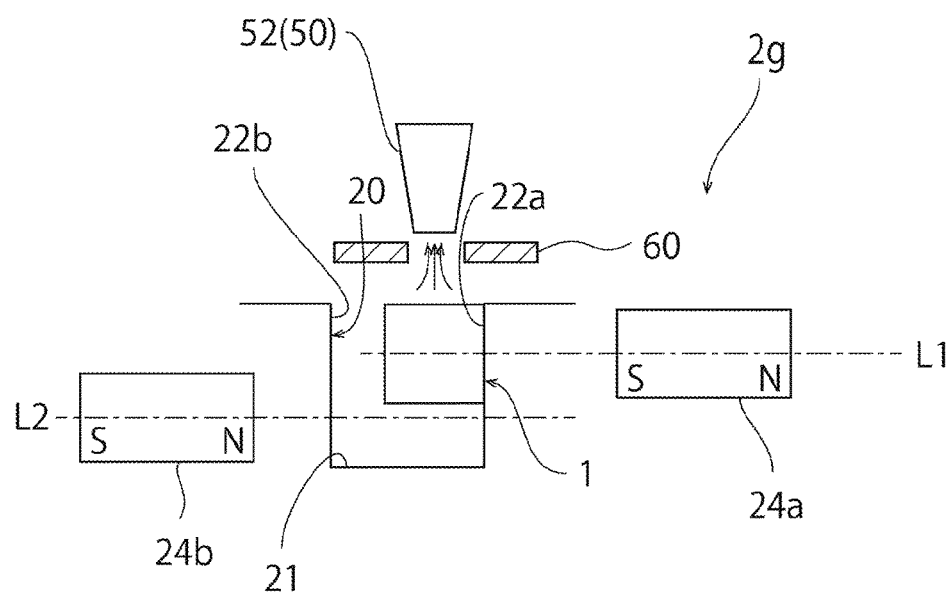
FIG. 15 is a schematic sectional view of a main part of an electronic component conveyance device according to an eighth embodiment.

As another example, an electronic component conveyance device 2f according to the seventh embodiment illustrated in FIG. 14 may further include a floating mechanism 50 that partially separates the lower face of the electronic component 1 off the bottom face 21 of the conveyance path 20 in the midstream part by air pressure. The floating mechanism 50 is provided with a blowing mechanism 51 that blows gas from the bottom face 21 toward the electronic component 1 positioned above. The gas (air) blown by the blowing mechanism 51 facilitates partial separation of the lower face of the electronic component 1 off the bottom face 21 and rotation of the electronic component 1.

As another example, an electronic component conveyance device 2g according to the eighth embodiment illustrated in FIG. is provided with, as the floating mechanism 50, a suction mechanism 52 that sucks, from above, the electronic component 1 being conveyed in the midstream part. The suction of the electronic component 1 by the suction mechanism 52 facilitates partial separation of the lower face of the electronic component 1 off the bottom face 21 and rotation of the electronic component 1. The suction mechanism 52 is preferably provided with a cover having a suction opening so as to prevent the electronic component 1 from coming into contact with the suction mechanism 52 when the electronic component 1 is sucked.

What is claimed is:

1. An electronic component conveyance device comprising:
   a conveyance path;
   a first magnetic force generation unit; and
   a second magnetic force generation unit;
   the conveyance path including an upstream part, a midstream part connected with the upstream part, and a downstream part connected with the midstream part,
   the conveyance path including a bottom face, a first sidewall, and a second sidewall that extend through the upstream part, the midstream part, and the downstream part,
   the first sidewall and the second sidewall facing each other at an interval,
   a first interval between the first sidewall and the second sidewall in the midstream part being larger than a second interval between the first sidewall and the second sidewall in the upstream part and a third interval between the first sidewall and the second sidewall in the downstream part,
   the first magnetic force generation unit being provided lateral to the first sidewall in the midstream part,
   the second magnetic force generation unit being arranged at a farther downstream side than the first magnetic force generation unit and lateral to the second sidewall in the midstream per,
   the midstream part including a first transition part connected with the upstream part and a second transition part connected with the downstream part,
   the first sidewall being parallel to a conveyance direction in the first transition part,
   the second sidewall extending in a direction different from the conveyance direction in the first transition part,
   the second sidewall being parallel to the conveyance direction in the second transition part, and
   the first sidewall extending in a direction different from the conveyance direction in the second transition part, wherein
   the first magnetic force generation unit and the second magnetic force generation unit each apply a magnetic force to an electric component so that the electric component can rotate about an axis extending in a length direction of the electric component.

2. The electronic component conveyance device according to claim 1, wherein the first magnetic force generation unit and the second magnetic force generation unit each include a permanent magnet or an electric magnet.

3. The electronic component conveyance device according to claim 1, wherein in the second transition part, the second sidewall is tilted with respect to the first sidewall, and an interval between the first sidewall and the second sidewall is smaller at a position closer to the downstream part.

4. The electronic component conveyance device according to claim 1, wherein the second sidewall includes a portion orthogonal to the conveyance direction in the first transition part.

5. The electronic component conveyance device according to claim 1, wherein magnetic force generated by the second magnetic force generation unit is weaker than magnetic force generated by the first magnetic force generation unit.

6. The electronic component conveyance device according to claim 1, wherein a height of a center of the first magnetic force generation unit with respect to the bottom face is higher than third interval/2.

7. The electronic component conveyance device according to claim 6, wherein a distance between a center of the first magnetic force generation unit and the bottom face is larger than a distance between a center of an electronic component being conveyed and the bottom face.

8. The electronic component conveyance device according to claim 1, wherein the bottom face includes a separating structure that separates a portion of a lower face of an electronic component off the bottom face.

9. The electronic component conveyance device according to claim 1, further comprising a floating mechanism that separates a portion of a lower face of the electronic component off the bottom face by air pressure.

10. An electronic component conveyance device comprising:
    a conveyance path;
    a first magnetic force generation unit; and
    a second magnetic force generation unit;
    the conveyance path including an upstream part, a midstream part connected with the upstream part, and a downstream part connected with the midstream part,
    the conveyance path including a bottom face, a first sidewall, and a second sidewall that extend through the upstream part, the midstream part, and the downstream part,
    the first sidewall and the second sidewall facing each other at an interval,
    a first interval between the first sidewall and the second sidewall in the midstream part being larger than a second interval between the first sidewall and the second sidewall in the upstream part and a third interval between the first sidewall and the second sidewall in the downstream part,
    the first magnetic force generation unit being provided lateral to the first sidewall in the midstream part,
    the second magnetic force generation unit being arranged at a farther downstream side than the first magnetic force generation unit and lateral to the second sidewall in the midstream part,
    the midstream part including a first transition part connected with the upstream part and a second transition part connected with the downstream part,
    the first sidewall being parallel to a conveyance direction in the first transition part, and
    the second sidewall being parallel to the conveyance direction in the second transition part, wherein
    the first magnetic force generation unit and the second magnetic force generation unit each apply a magnetic force to an electric component so that the electric component can rotate about an axis extending in a length direction of the electric component.

11. The electronic component conveyance device according to claim 10, wherein the first magnetic force generation unit and the second magnetic force generation unit each include a permanent magnet or an electric magnet.

12. The electronic component conveyance device according to claim 10, wherein in the second transition part, the second sidewall is tilted with respect to the first sidewall, and an interval between the first sidewall and the second sidewall is smaller at a position closer to the downstream part.

13. The electronic component conveyance device according to claim 10, wherein the second sidewall includes a portion orthogonal to the conveyance direction in the first transition part.

14. The electronic component conveyance device according to claim 10, wherein magnetic force generated by the second magnetic force generation unit is weaker than magnetic force generated by the first magnetic force generation unit.

15. The electronic component conveyance device according to claim 10, wherein a height of a center of the first magnetic force generation unit with respect to the bottom face is higher than third interval/2.

16. The electronic component conveyance device according to claim 10, wherein the bottom face includes a separating structure that separates a portion of a lower face of an electronic component off the bottom face.

17. The electronic component conveyance device according to claim 10, further comprising a floating mechanism that separates a portion of a lower face of the electronic component off the bottom face by air pressure.

* * * * *